United States Patent

Suzuki et al.

[11] Patent Number: 5,379,818
[45] Date of Patent: Jan. 10, 1995

[54] BELTED RADIAL TIRE FOR MOTORCYCLE

[75] Inventors: Shigehiko Suzuki, Amagasaki; Itsuo Yasui, Nishinomiya; Sadaaki Naito, Kobe, all of Japan

[73] Assignee: Sumitomo Rubber Industries, Ltd., Kobe, Japan

[21] Appl. No.: 122,171

[22] Filed: Sep. 17, 1993

Related U.S. Application Data

[63] Continuation of Ser. No. 687,015, Apr. 18, 1991, abandoned.

[30] Foreign Application Priority Data

| Apr. 18, 1990 | [JP] | Japan | 2-103305 |
| Apr. 24, 1990 | [JP] | Japan | 2-109349 |
| May 7, 1990 | [JP] | Japan | 2-117936 |

[51] Int. Cl.⁶ .............................. B60C 9/22
[52] U.S. Cl. .............................. 152/531; 152/533; 156/117
[58] Field of Search ............ 152/530, 531, 533, 455; 156/117, 123, 397

[56] References Cited

U.S. PATENT DOCUMENTS

| 4,869,307 | 9/1989 | Bormann et al. | 152/533 |
| 4,987,938 | 1/1991 | Ushikubo et al. | 152/531 |
| 4,990,203 | 2/1991 | Okada et al. | 156/117 |
| 5,032,198 | 7/1991 | Kojima et al. | 156/117 |
| 5,176,770 | 1/1993 | Ohkuni | 152/533 |

FOREIGN PATENT DOCUMENTS

| 58-160805 | 9/1983 | Japan . | |
| 85203 | 4/1986 | Japan | 152/533 |
| 1487426 | 9/1977 | United Kingdom | 156/117 |

*Primary Examiner*—Geoffrey L. Knable

[57] ABSTRACT

A belted radial tire for motorcycles which comprises: a pair of bead cores disposed one in each bead portion of the tire; a carcass extending between the bead portions through sidewall portions and a tread portion of the tire, the carcass having at least one ply of organic fiber cords arranged radially at an angle of 60 to 90 degrees to the tire equator; a tread disposed radially outside the carcass to define the tread portion; and a belt disposed radially outside the carcass and inside the tread and comprising two ply pieces made of at least one spirally wound cord having an elastic modulus of not less than 600 kgf/sq.mm, the above-mentioned tread curved so that the maximum cross section width of the tire lies between the tread edges, each of the two belt ply pieces formed by winding a ribbon of rubber, in which the belt cord is embedded, spirally around the carcass from the axially outer edge thereof toward the tire equator.

9 Claims, 8 Drawing Sheets

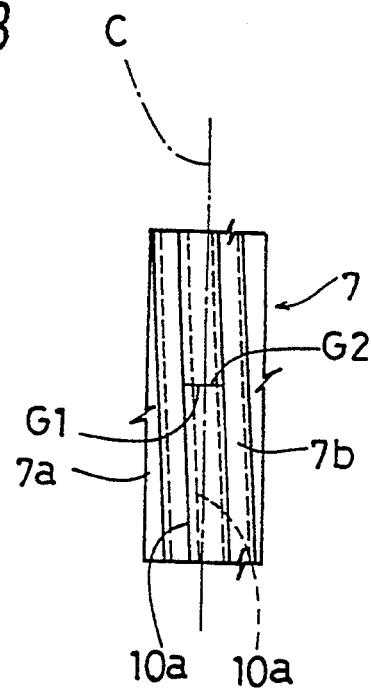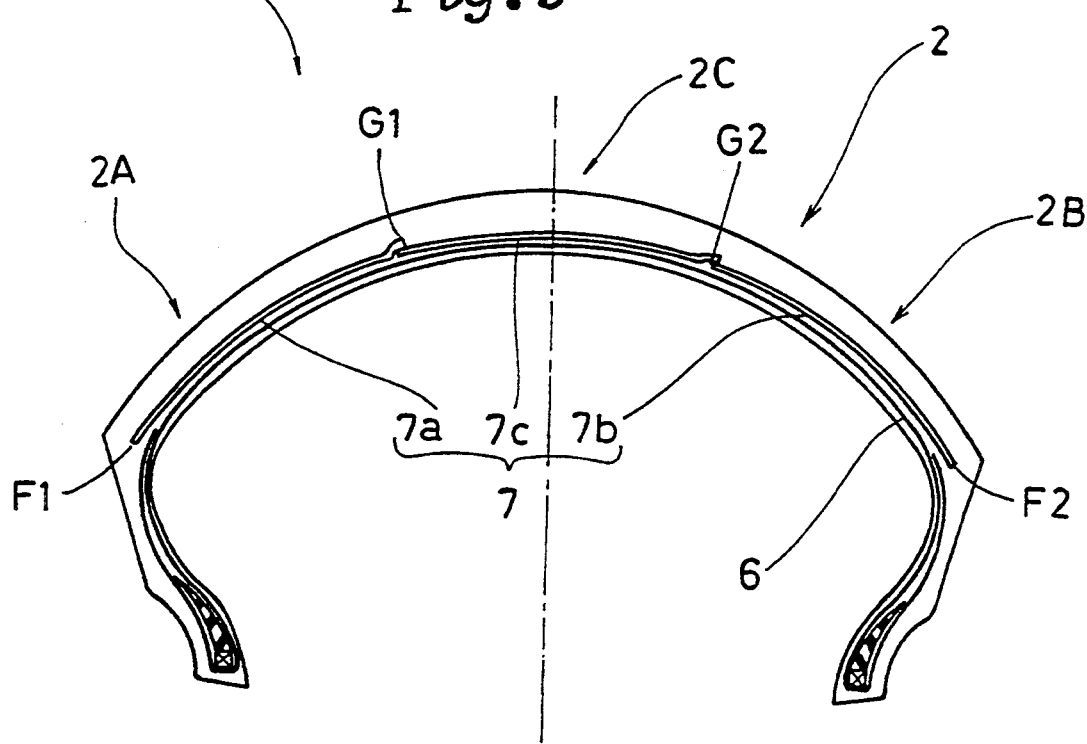

Fig. 16
Fig. 17
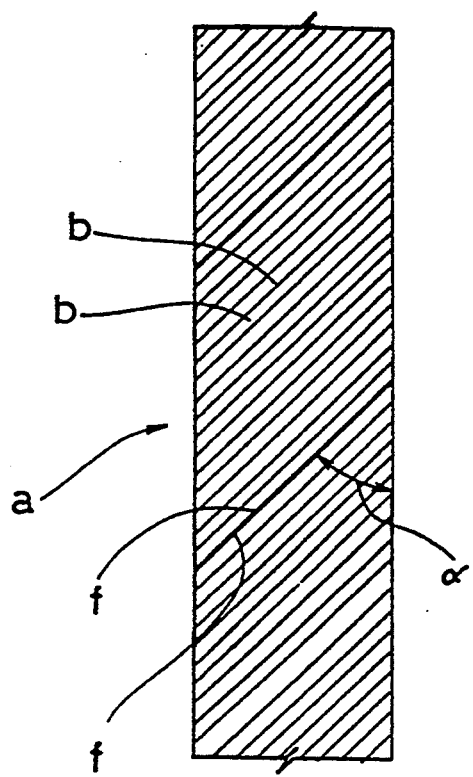
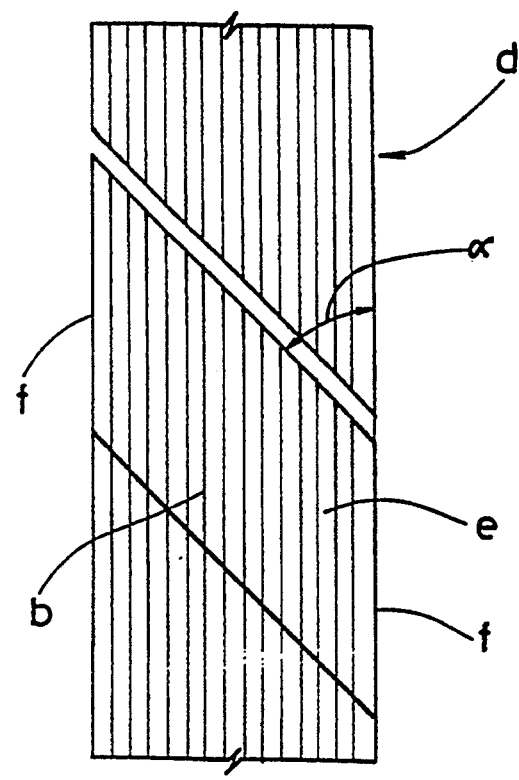

BELTED RADIAL TIRE FOR MOTORCYCLE

This application is a continuation of application Ser. No. 07/687,015 filed on Apr. 18, 1991, now abandoned.

The present invention relates to a belted radial tire for motorcycles and a method of making the belt.

BACKGROUND OF THE INVENTION

Recently, a radial ply carcass has been used for motorcycle tires. Such a motorcycle radial tire has been made based on the technique for four-wheeled vehicle tires, e.g. passenger car tires. That is, the tire has been provided with a belt reinforcement formed as follows: a rubberized fabric (d) is cut bias at a small angle (alpha) to the cord direction as shown in FIG. 17, which is usually 15 to 30 degrees; and the cut fabric (e) is wound around a carcass with connecting the ends (f) as shown in FIG. 16 to form an annular belt reinforcement (a), and accordingly, the laid angle of the belt cords (b) to the tire equator becomes the same bias angle (alpha). In such a bias belt structure, however, steering stability during straight running and cornering, especially at high speed, is not good.

On the other hand, Japanese Utility-Model Publication No. 58-160805 discloses a belt making method, in which a belt cord is wound spirally and continuously from its one edge to the other edge at a generally zero angle to the circumferential direction of the tire so as to form a jointless belt. When this is used in the motorcycle tire, instead of the conventional belt, high speed steering stability can be improved, but belt edge separation failure and deterioration of tire uniformity are often observed.

SUMMARY OF THE INVENTION

It is therefore, an object of the present invention to provide a motorcycle radial tire, in which straight running performance and cornering performance during high speed running are improved, and at the same time belt edge separation failure and deterioration of tire uniformity are effectively prevented.

According to one aspect of the present invention, a radial tire for motorcycles comprises:

a pair of bead cores disposed one in each bead portion of the tire;

a carcass extending between the bead portions through sidewall portions and a tread portion of the tire, the carcass having at least one ply of organic fiber cords arranged radially at an angle of 60 to 90 degrees to the tire equator;

a tread disposed radially outside the carcass to define the tread portion; and a belt disposed radially outside the carcass and inside the tread and comprising two ply pieces made of at least one spirally wound cord having an elastic modulus of not less than 600 kgf/sq.mm, the tread curved so that the maximum cross section width of the tire is lying between the tread edges, each of the two belt ply pieces formed by winding a ribbon of rubber, in which the above-mentioned at least one cord is embedded, spirally around the carcass from the axially outer edge thereof toward the tire equator.

According to one aspect of the present invention a method of making a belt for the radial tire for motorcycles comprises the steps of:

feeding two ribbons of rubber, in which at least one belt cord is embedded, towards a drum having an outer cylindrical face having a round profile;

fixing the ends of said two ribbons to positions in side edge regions of the cylindrical face corresponding to the belt edges; and moving the ribbons transversely of the cylindrical face toward the center thereof while the drum is revolving and the ribbons are being fed so that each ribbon is wound around the drum spirally from the axially outer edge to the inner edge of each belt piece.

BRIEF DESCRIPTION OF THE DRAWINGS

Embodiments of the present invention will now be described in detail with reference to the accompanying drawings, in which:

FIG. 8 is a plan view showing a termination of the ribbons thereof according to the present invention;

FIG. 9 is a sectional view showing another tire embodiment according to the present invention;

FIGS. 16 and 17 are plan views showing a conventional belt and the making method.

DETAILED DESCRIPTION OF THE DRAWINGS

Figure 1:
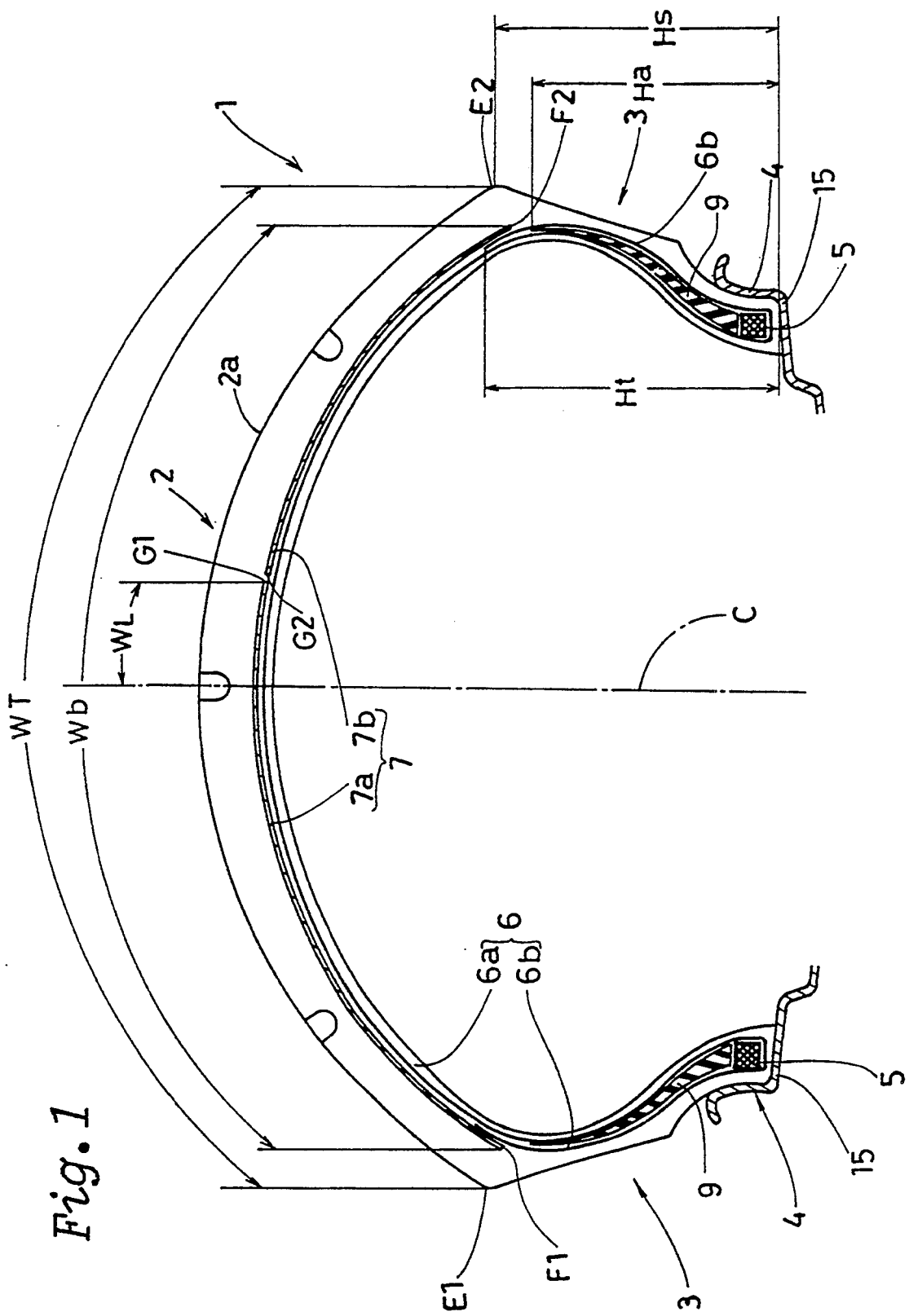
FIG. 1 is a sectional view showing a tire according to the present invention.

In the figures, motorcycle tire 1 has a tread portion 2, a pair of bead portions 4, and a pair of sidewall portions 3 extending radially inwardly of the tire from the edges of the tread portion 2 to the bead portions 4.

The tread portion 2 is curved so that the maximum cross sectional width of the tire lies between the edges E1 and E2 of the tread, and the tread has a arched profile which is generally one third of a circle. The tire has an aspect ratio of not more than 60%.

The tire 1 comprises: a pair of bead cores 5 disposed one in each bead portion 4; a carcass 6 extending between the bead portions 4 through the sidewall portions 3 and the tread portion 2, and having at least one ply of radially arranged cords turned up around the bead cores 5 from the axially inside to outside thereof to form two turned up portions 6b and a main portion 6a therebetween; a tread 2a disposed radially outside the carcass to define the tread portion; a belt 7 disposed radially outside the carcass 6 and inside the tread; and a bead apex 9 disposed between the carcass main portion 6a and each carcass turned up portion 6b and extending radially outwardly and taperingly from the bead core.

The carcass 6 has one ply of cords arranged radially at an angle of 60 to 90 degrees, preferably 70 to 90 degrees, with respect to the tire equator C.

For the carcass cords, organic fiber cords, e.g. nylon, rayon, polyester, aromatic polyamide and the like can be used.

Each turned up portion 6b is extended radially outwardly, and the radial height Ht of the radially outer edge of the turned up portion is 0.5 to 1.2 times the radial height Hs of the tread edge E1, E2, both measured from the bead base line 15. When the height Ht is less than 0.5 times the height Hs, the reinforcement becomes insufficient for the bead portion to endure bending deformation, and the durability is deteriorated. When the height Ht is more than 1.2 times the height Hs, the rigidity of the sidewall portion as well as the bead portion becomes excessively increased, and ride comfort is deteriorated.

In this embodiment, each carcass turned up portion 6b is extended to a position in the tread portion to be sandwiched between the carcass and each belt edge portion.

The bead apex 9 is made of hard rubber having a JIS A hardness of not less than 60. The radial height Ha of the radially outer edge thereof from the bead base line 15 is 0.5 to 1.2 times the radial height Hs of the tread edge from the bead base line 15, and the height Ha is lower than the height Ht. When the height Ha is less than 0.5 times the height Hs, the rigidity of the bead portion against bending deformation is low, and the bead durability is decreased. When the height Ha is more than 1.2 times the height Hs, the rigidity of the sidewall portion and the bead portion excessively increased, and ride comfort is deteriorated.

The belt 7 is composed of spirally wound cords, and the belt width Wb measured along the curved belt is 0.7 to 1.0 times the tread width WT measured between the tread edges E1 and E2 along the tread face. When the width Wb is less than 0.7 times the tread width WT, the rigidity of tread shoulder regions is decreased, and stability in quick turn is lost. When the width Wb is more than 1.0 times the tread width WT, ride comfort is deteriorated by the excessively increased sidewall rigidity.

For the belt cord 11, organic fiber cords, for example polyfluoroethylene (TEFLON), aromatic polyamide, polyester and the like, or steel cords, having a high modulus of elasticity of not less than 600 kgf/sq.mm, are used. When the elastic modulus is less than 600 kgf/sq.mm, the tread portion has an insufficient rigidity, and the directional stability and cornering performance at high speed and the durability are deteriorated. Preferably, aromatic polyamide fiber cords having a high modulus of the same level as steel are used.

In the embodiment shown in FIG. 1, the belt 7 is composed of a two-piece ply made up of a piece 7a and a piece 7b. Piece 7a extends from a position F1 near the tread edge E1 to a position G1 near the tire equator C. Piece 7b extends from a position F2 near the tread edge E2 to a position G2 near the tire equator C.

In each ply piece, at least one belt cord 11 is wound spirally and continuously from its axially outer edge to inner edge at zero angle or a small angle with respect to the tire equator C.

In FIG. 1, the left piece 7a is extended over the tire equator C and terminated at the position G1 located on the right side of the equator and the right piece 7b is extended to a substantially same position G2 and terminated thereat.

The distance WL measured along the belt 7 from the tire equator C to the position G1 is 0.1 to 0.3 times the abovementioned tread width WT. When the distance WL is less than 0.1 times WT, the joint part between the axially inner edges G1 and G2 of the pieces 7a and 7b is liable to be fatigued by the repeated deformation during straight running, and finally cord separation is caused. When the distance WL is more than 0.3 times WT, the tire uniformity is liable to be disturbed.

The belt 7 is formed by winding a ribbon 10 around the circumference of the carcass 6. The ribbon is a strip of rubber 12 in which a cord or a plurality of parallel cords 11 are embedded.

Figure 2:
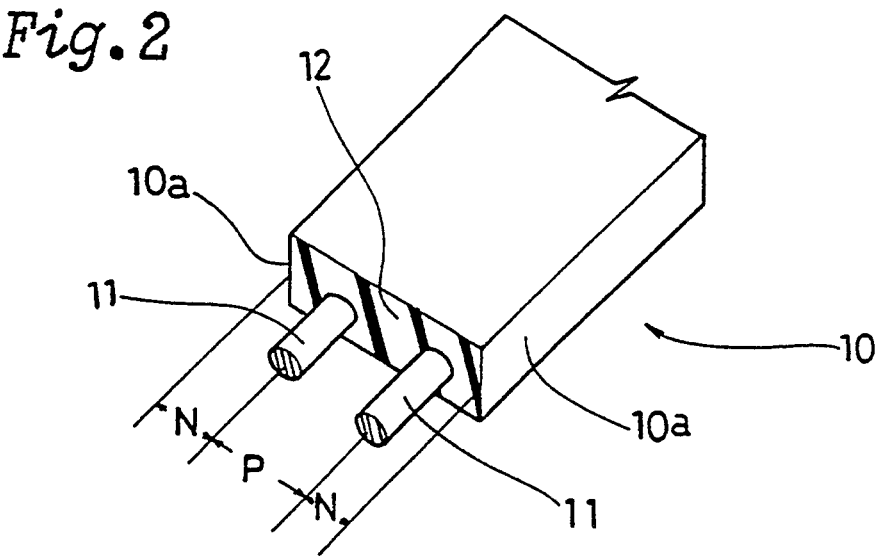
FIG. 2 is a perspective view showing a belt cord ribbon.

FIG. 2 shows an example of the ribbon 10, wherein the cross sectional shape thereof is a flat rectangle, and two parallel belt cords 11 are embedded therein at a pitch P, and the distance N measured from the edge 10a of the ribbon to the center of the outermost adjacent cord is set to be not more than ½ of the cord pitch P.

Figure 3:
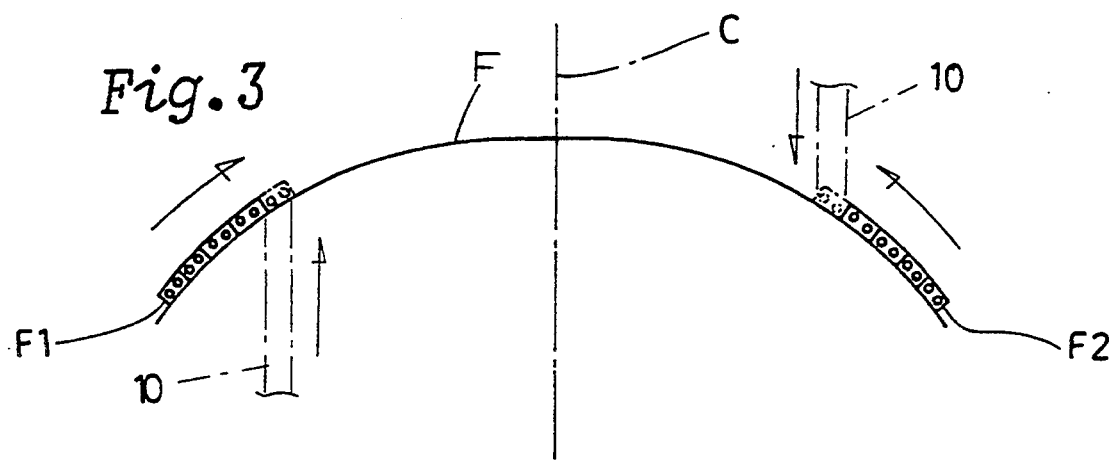
FIGS. 3 and 4 are sectional views explaining a method of making the belt of the present invention.
Figure 4:
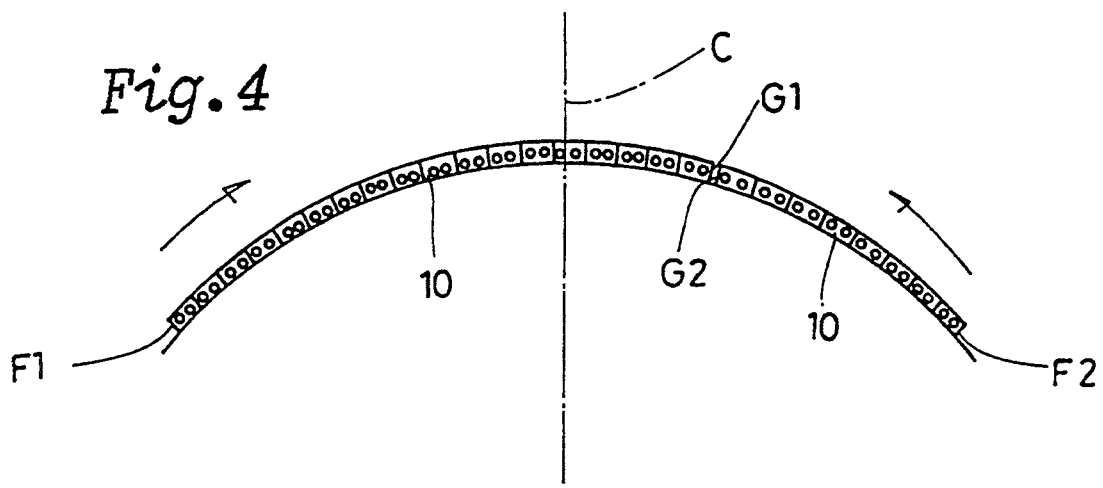

In order to make the above-mentioned belt 7, as shown in FIGS. 3 and 4, two ribbons 10 are used. The ribbons to be wound are supplied from two different or opposite directions as indicated by a chain line in FIG. 3, and they are simultaneously wound spirally around a profiled cylindrical face F, which Is revolved around its axis, towards the tire equator C starting from the respective axially outer edges F1 and F2 to the inner edges G1 and G2 so that the ribbon in the ply piece 7a and the ribbon in the ply piece 7b are inclined In the same direction at the same small angle to the tire equator.

As mentioned above, the tread profile is about one third of a circle, and the carcass in the tread portion and the belt profile are each provided with a round profile similar to the tread profile.

The above-mentioned profiled cylindrical face F is generally the radially outer face of the unvulcanized carcass applied to a profile drum of which outer surface is formed in a round profile to give the designed profile to the carcass. That is, generally the ribbon is wound directly on the carcass. However, the profiled face F may be the outer surface of a belt shaping drum which has the same profile as the carcass.

Figure 5:
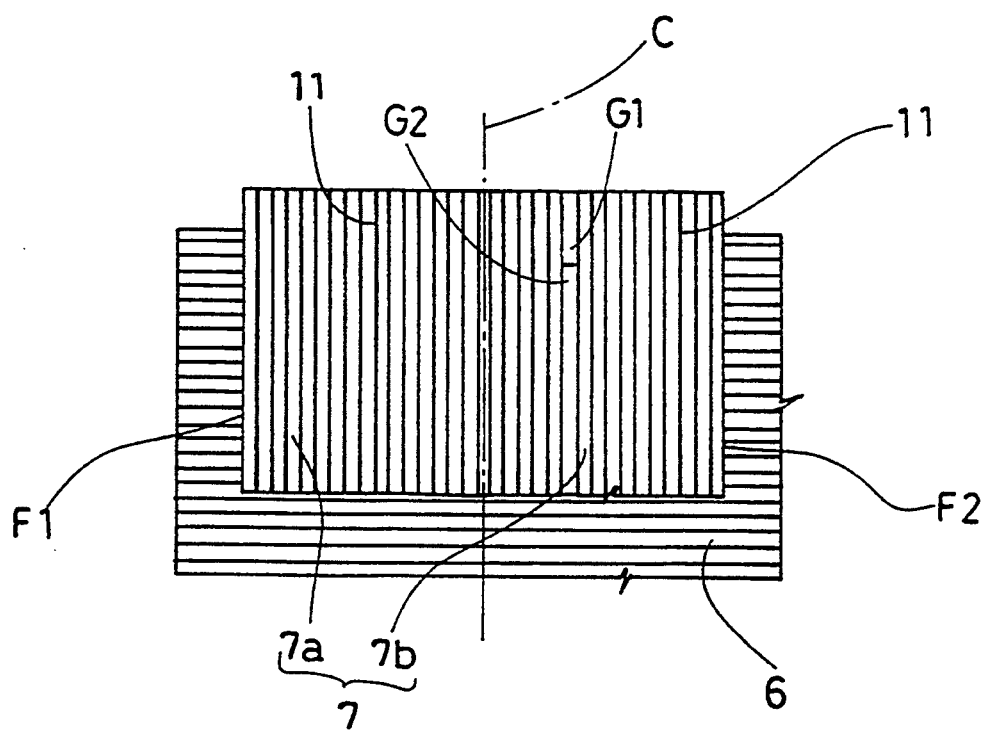
FIG. 5 is a plan view showing an arrangement of the belt cords and the carcass cord.

The terminal ends G1 and G2 of the ribbons are butt jointed as shown in FIG. 5 and fixed by means of adhesive tape or adhesive agent if needed.

As the result, the ribbon is wound radially outwardly, while pressing the previously wound part thereof by its edge, thereby preventing the wound ribbon from being loosened.

If the above-mentioned distance WL is more than 0.3 times the tread width WT, when the ribbon exceeds such distance, the ribbon should be wound radially inwardly while decreasing its winding diameter, and accordingly the ribbon is easily loosened. As a result, accuracy in winding pitches is liable to be lost.

On the other hand, the tire can be made as follows: a raw carcass is applied to the outer face of the profile drum; the edge portions of the carcass are folded back around the bead cores to sandwich a raw rubber bead apex between the carcass main portion and each folded edge; raw belt ribbons are wound as explained above; a raw rubber tread, sidewalls and so on are applied to the outer side of the belt and carcass; the assembly is inserted into a vulcanizing mold; an inflating tube is disposed inside the assembly; the tube is inflated to press the assembly against the negative impression of the mold; and the assembly is vulcanized.

Figure 6:
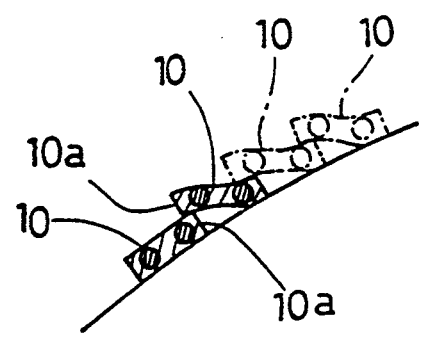
FIG. 6 is a sectional view showing another method of making the belt.

FIG. 6 shows an expedient to further prevent the looseness of the wound ribbon during the winding operation. The ribbon 10 is wound so that the edge 10a thereof overlaps with the adjacent edge 10a of the previously wound part thereof to press it onto the face F. Accordingly, the wound ribbon is prevented from being loosened, and as a result belt edge separation during running is prevented.

By winding in this way, as shown in FIG. 5, the belt 7 has an asymmetrical structure with respect to the tire equator C, in which the inclination of the cords and the winding direction of the cords in one belt ply piece is same as those in the other piece.

However, the belt can be provided with a symmetrical structure by supplying the ribbons from the same direction contrary to the FIG. 3. Thus, the winding direction of the cords in one belt ply piece is differed from that in the other piece.

Figure 7:
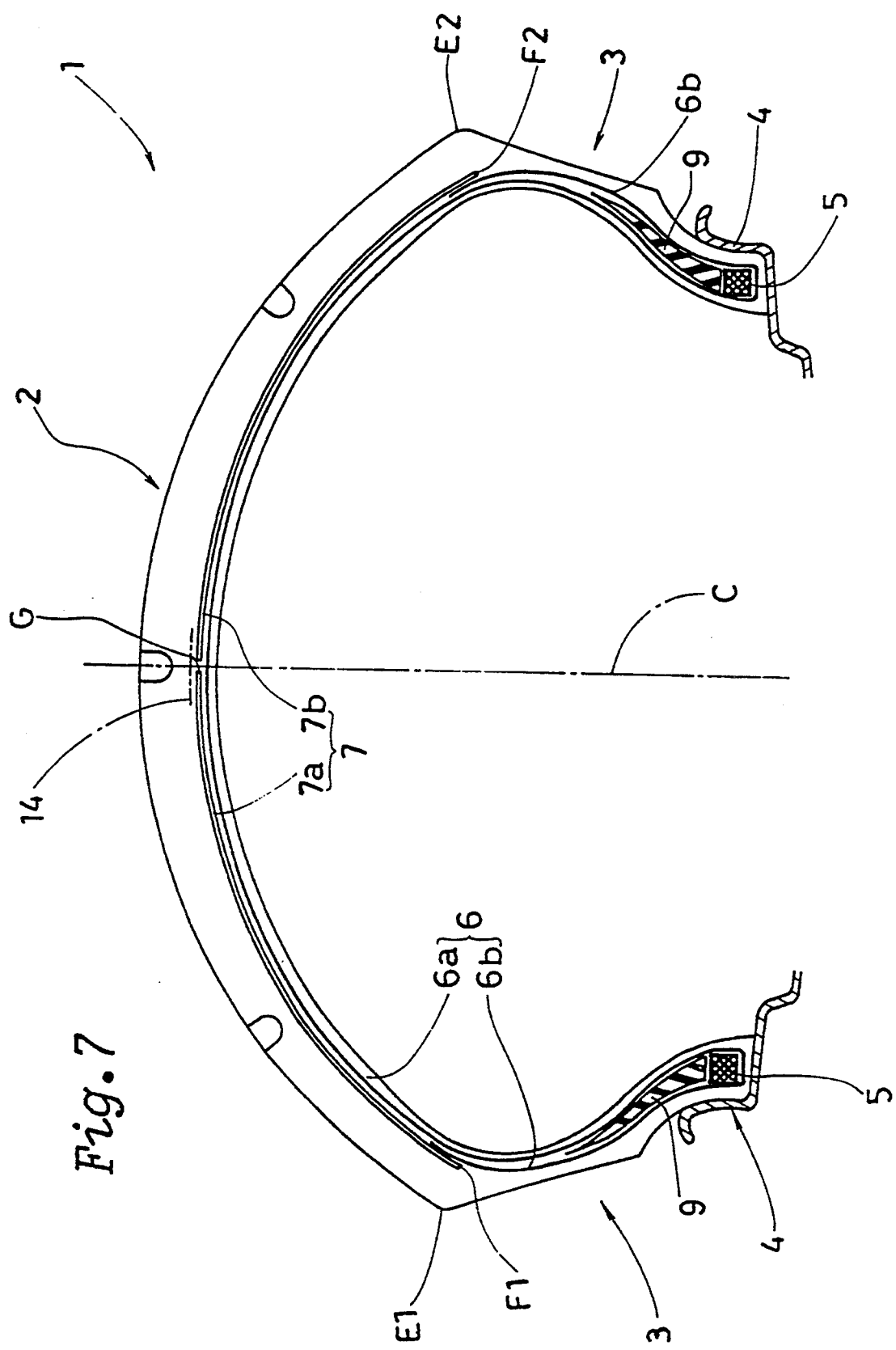
FIG. 7 is a sectional view showing a tire according to the present invention.

FIG. 7 shows a modification of the above-mentioned two-piece belt 7, in which a left piece 7a and a right piece 7b are extended from the position F1, F2, respectively, to the tire equator C and terminated at the equator. Therefore, the ribbons 10 are wound spirally from the positions F1 and F2 to the tire equator C, and the ends G1 and G2 thereof are butt jointed on the tire equator C as shown in FIG. 8. In this example, two ribbons are fed from two opposite directions as shown in FIG. 3, and as the result the cord inclining direction of one belt piece 7a is the same direction as the other piece 7b, and the cord arrangement is asymmetric with respect to the tire equator. However, the cord arrangement can be made symmetric with respect to the tire equator by feeding the ribbons from the same directions. If a gap G of not more than the cord pitch P is formed between the axially inner edges of the ply pieces 7a and 7b, the gap can remains as it is. However, to reinforce the joint part, such a gap can be covered by a reinforcing strip 14 disposed over the joint part.

FIG. 9 shows another example of the belt 7, in which the belt is composed of a three-piece ply made up of a central piece 7c and two lateral pieces 7a and 7b. Each piece has a width of about one third of the belt width Wb. In FIG. 9, the left piece 7a is extended from the position F1 to a position G1 located on the left side of the tire equator, and the right piece 7b is extended from the position F2 to a position G2 located on the right side of the tire equator, and the central piece 7c is extended between the positions G1 and G2. In this example, the adjacent pieces are overlapped by a certain width.

In order to make the three-piece belt 7, three ribbons 10 are simultaneously wound around the profiled face F as follow: the ribbon for the left piece 7a is wound from the position F1 to the position G1; the ribbon for the right piece 7b is wound from the position F2 to the position G2; the ribbon for the central piece 7c is wound from the position G1 to the position G2; and the ribbons for the left piece and central piece are supplied from the same direction, but the ribbon for the right piece is supplied from an opposite direction. Accordingly, the winding time decreases to about one third of the time when the ribbon is wound continuously from one edge to the other edge of the belt. The ribbons in the three pieces 7a, 7b and 7c are inclined in the same direction at the same small angle to the tire equator.

Figure 10:
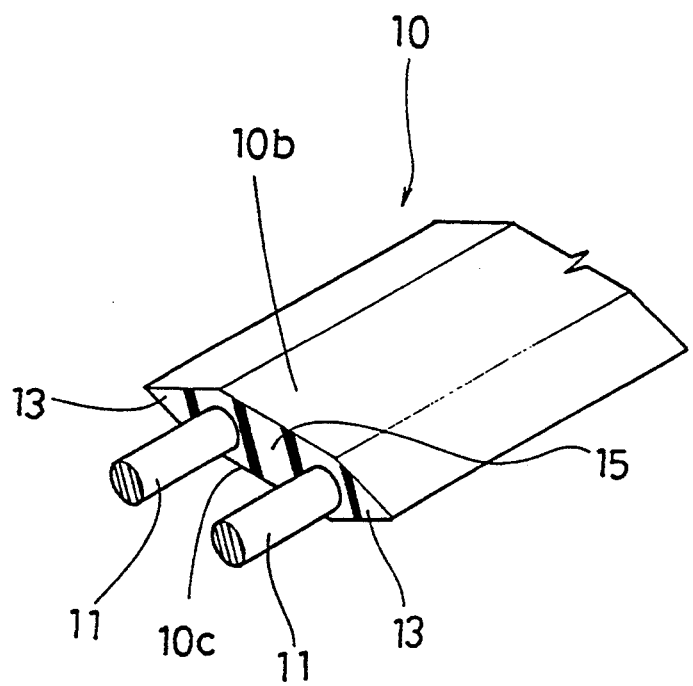
FIG. 10 is a perspective view showing another example of the ribbon.
Figure 13:
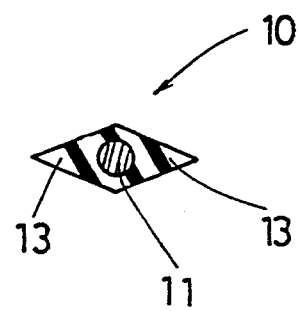
FIG. 13 is a sectional view showing another example of the ribbon.
Figure 14:
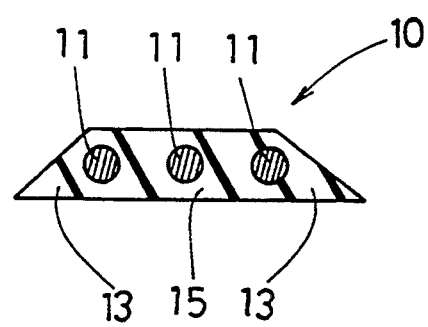
FIG. 14 is a sectional view showing still another example of the ribbon.

In order to make a smooth overlap of the ribbon edges, the cross sectional shape of the ribbon 10 can be modified as shown in FIGS. 10, 13 and 14. In each example, the edges of the ribbon 10 are tapered.

In FIG. 10, the cross sectional shape of the ribbon 10 is a flat hexagon in which the upper side and lower side of each tapered portion are formed in the same length, and two parallel cords 11 are embedded in its main portion 15 along the longitudinal direction of the ribbon.

Figure 11:
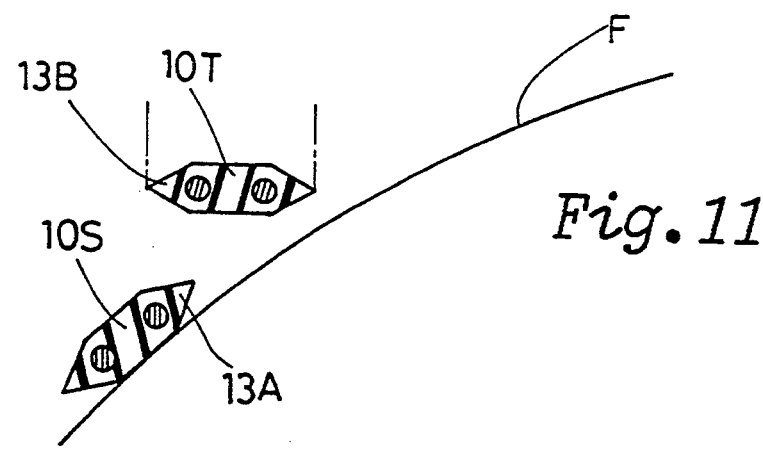
FIGS. 11 and 12 are sectional views showing the operation thereof of making the belt.
Figure 12:
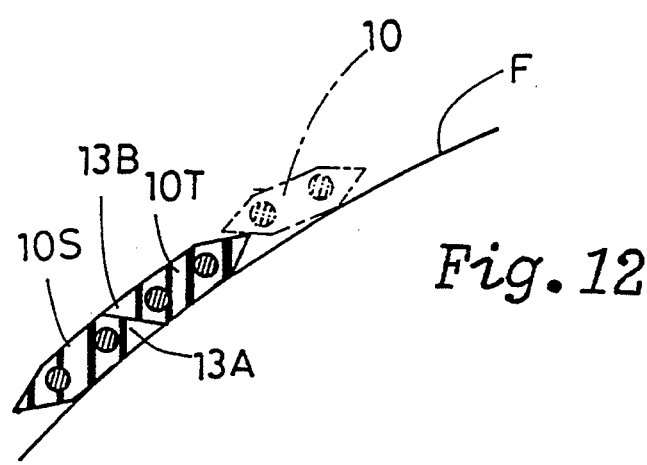

This hexagonal ribbon is wound as shown in FIGS. 11 and 12. A previously wound portion 10S is set on the profiled face F with its one side 10c contacting with the face F. As the drum revolves, the portion 10T to be wound approaches to the wound portion 10S, and its tapered edge 13B contacts with the tapered edge 13A of the previously wound portion and pressed thereto. As the result, the tapered edges 13A and 13B are deformed as shown in FIG. 12.

In FIG. 13, the cross sectional shape of the ribbon 10 is a rhombus, and one cord 11 is embedded therein. In this case, the cord inclination can be made smaller than the above-mentioned ribbons in which plural cords are embedded.

Figure 15:
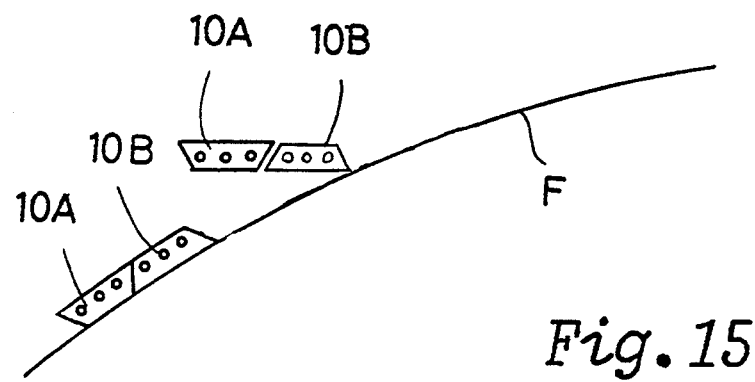
FIG. 15 is a sectional view showing still another method of making the belt using the ribbon shown in FIG. 14.

In FIG. 14, the cross sectional shape of the ribbon 10 Is a flat trapezoid, and three parallel cords 11 are embedded in its main portion 15 along the longitudinal direction of the ribbon. In this case, contrary to the previous case, the cord inclination can be largely increased. As shown in FIG. 15, two adjoining ribbons 10A and 10B one of which is reversed are simultaneously fed toward the drum and wound. The ribbons 10A and 10B when not wound are separated, but the wound ribbons 10A and 10B on the profiled face F contact with each other. Incidentally, the sectional shape (width), the number of the embedded cords, the cord material, the rubber hardness and the like can be changed between the ribbon 10A and the ribbon 10B.

On the other hand, as the profiled face F is curved, the angle between the face F and the widthwise direction of the ribbon to be wound becomes very large, for example over 45 degrees, in a lateral region thereof. Therefore, when the ribbon has a rectangular section as shown in FIG. 2, the ribbon sometimes contacts with the face F only at its side face 10a, which makes a twisted part and disturbs the cord pitches. However, by making the tapered portions 13 as explained above, such problems can be solved.

Incidentally, in each of the pieces and/or between the pieces, the inclination of the ribbon or cords can be changed.

In addition to the above-explained method of making the plural piece belt, the tapered ribbons shown in FIGS. 10, 13 and 14 can be combined with a method of making a one piece belt, in which at least one ribbon is wound spirally and continuously from one edge to the other edge of the belt.

We claim:

1. A belted radial tire for motorcycles comprising:
    a pair of bead portions, each of said bead portions having a bead core disposed therein;
    a pair of sidewall portions;
    a tread portion having a tread including a pair of tread edges;
    a carcass extending between the bead portions through the sidewall portions and the tread portion of the tire, said carcass having at least one ply of organic fiber cords arranged radially at an angle of 60 to 90 degrees to the tire equator; and a belt disposed radially outside said carcass and inside the tread and comprising two laterally adjacent ply pieces, each of said two ply pieces made of at least one spirally wound cord having an elastic modulus of not less than 600 kgf/mm², said tread curved so that the maximum cross section width of the tire is lying between the tread edges, each of said two belt ply pieces formed by winding a ribbon of rubber, in which said at least one cord is embedded, spirally around said carcass from the axially outer edge thereof toward the tire equator, wherein said two belt ply pieces are extended to a position near the tire equator to be jointed at said position, the distance of said joint position measured from the tire equator along the belt is 0.1 to 0.3 times the tread width measured between the tread edges along the tread face, and the width of said belt measured therealong is 0.7 to 1.0 times said tread width.

2. The radial tire according to claim 1, wherein the adjacent edges of the wound ribbon In each piece are overlapped each other.

3. The radial tire according to claim 1, wherein the cross sectional shape of the ribbon is a flat rectangle.

4. The radial tire according to claim 2, wherein the edges of the ribbon are tapered.

5. The radial tire according to claim 4, wherein the cross sectional shape of the ribbon is a flat hexagon.

6. The radial tire according to claim 4, wherein the cross sectional shape of the ribbon is a rhombus.

7. The radial tire according to claim 4, wherein the cross sectional shape of the ribbon is a flat trapezoid.

8. The radial tire according to claim 1, wherein
said at least one ply of said carcass is a ply of radially arranged cords turned up around the bead cores from the axially inside to outside thereof to form two turned up portions, and
a radial height of said two turned up portions is 0.5 to 1.2 times the radial height of the tread edges, both measured from the bead base line.

9. The radial tire according to claim 1, wherein
said at least one ply of said carcass is a ply of radially arranged cords turned up around the bead cores from the axially inside to outside thereof to form two turned up portions, and
a radially outer edge of each said turned up portion is interposed between the carcass and each edge of the belt.

* * * * *